July 31, 1956  J. M. HOOD  2,757,364
METER AND APPARATUS FOR READING THE SAME
Filed April 20, 1954  2 Sheets-Sheet 1

James M. Hood
INVENTOR.

BY Browning & Simms

ATTORNEYS

July 31, 1956 J. M. HOOD 2,757,364
METER AND APPARATUS FOR READING THE SAME
Filed April 20, 1954 2 Sheets-Sheet 2
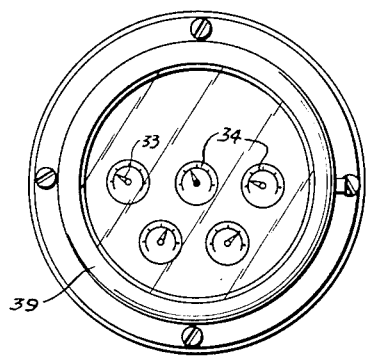
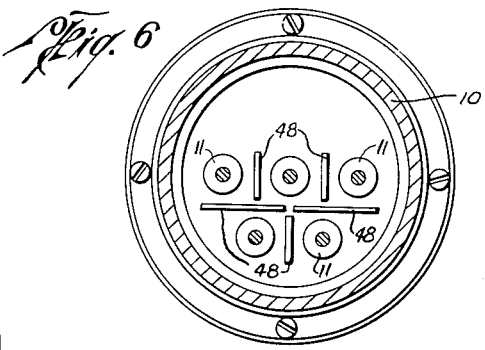
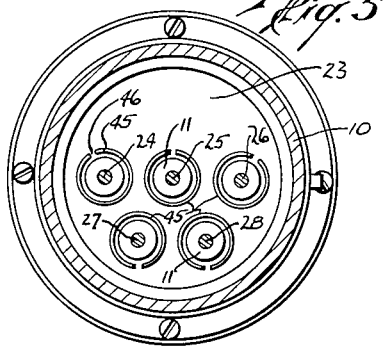
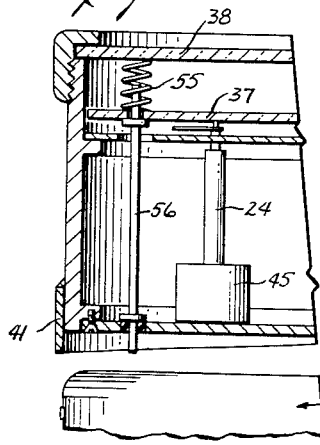
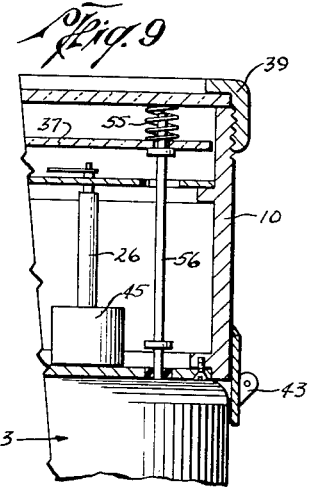
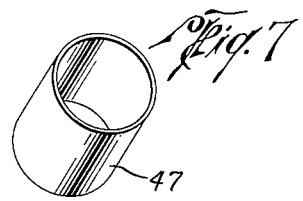
James M. Hood
INVENTOR.
BY Browning & Simms
ATTORNEYS

United States Patent Office

2,757,364
METER AND APPARATUS FOR READING THE SAME

James M. Hood, San Antonio, Tex.

Application April 20, 1954, Serial No. 424,872

8 Claims. (Cl. 340—378)

---

This invention relates to a meter construction and to apparatus for indicating the result of metering a quantity of a substance such as gas, electricity or water by a meter. In one of its aspects, this invention relates to an apparatus for positively indicating the relative rotational position of a plurality of indicating shafts turned by a metering apparatus and heretofore bearing pointers whose positions were observed through a window in the meter head.

This application is a continuation-in-part of my applications Serial No. 253,124, filed October 25, 1951, now abandoned, and Serial No. 271,391, filed February 13, 1952, now abandoned.

Reference is made to co-pending application Serial No. 286,109, filed May 5, 1952, wherein there is disclosed and claimed an apparatus providing recordings of meter readings.

It is conventional in commercial meters, such as meters employed to measure domestic and commercial consumption of water, gas or electricity, to provide a meter dial on which is cumulatively reflected the volume or quantity of material passing through a meter over a period of time. This dial ordinarily has a plurality of shafts each of which carries a pointer to indicate the quantity of material having passed through the meter. In water meters, for example, the various shafts and pointers indicate the tens, hundreds, thousands, tens of thousands and hundreds of thousands of gallons passing through the meter. The face of such a dial is observed through a glass window which seals the meter head from the intrusion of moisture and other foreign matter.

The meter dials, particularly those of water meters, are often submerged below the surface of the ground within a surrounding housing, and it is not unusual for water and solid foreign material to fill this housing and seep into the meter head around the glass window to cause the meter head to become corroded and out of working order. And even when not so submerged, a faulty seal around the window in the meter head will cause the same result. This incapacitation of meters is practically inevitable when the glass which covers the meter dial face becomes broken by children or others, which often happens. Also the glass faces often become encrusted with dirt or with condensed moisture on their inner surface which means they must be removed and cleaned. Thus, there is a constant source of repair expense in order to maintain the meters in operable condition.

Further, in water meters, the gears providing a proper driving ratio between a shaft driven by a metering element in the meter body and the various shafts bearing the indicating pointers are usually located in the meter head. The meter head is sealed from the meter body, the latter usually being filled with water under pressure, by a dividing wall through which extends the shaft driven by the metering element, the latter being provided with a packing between itself and the dividing wall. Not only is such a packing apt to leak but in many instances, it will fail altogether so that the gearing in the meter head becomes wet and subject to corroding. To combat this, the gears are usually made of brass or other corrosion resistant material.

It is an object of this invention to provide an apparatus including a meter head having a metal face thereby eliminating the conventional glass window and hence the disadvantages thereof.

Another object of this invention is to provide in a meter apparatus a means permitting the conventional glass window of the meter head to be replaced with a metal plate, the means including magnets disposed on both sides of said plate, the magnets on one side being rotated by the meter and the magnets on the other side being driven by said rotated magnets whereby the meter head can be enclosed with metal and yet a meter reading taken.

Another object of this invention is to provide an indicating apparatus adapted to be used to read a meter, the latter being capable of being completely enclosed in metal to eliminate the danger of breakage of glass faces and to decrease the maintenance cost of the meter, such reading being capable of accomplishment even though the meter head is under water.

Another object of this invention is to provide an indicating apparatus in the use of which the relative rotational positions of indicating shafts in a meter head are magnetically transmitted through a metal meter head to the indicating apparatus for making a meter reading.

Another object of this invention is to provide an apparatus wherein the relative rotational position of meter indicating shafts is transmitted through a metal meter head by the agency of oppositely disposed magnets so positioned and arranged that one magnet will magnetically align itself with an opposite magnet and thereby transmit to an indicator the relative rotational position of said meter shafts.

Another object of this invention is to provide in such a meter indicating apparatus a detent means for securing proper alignment between the apparatus and a meter.

Another object of this invention is to provide a reading tool adapted to indicate the relative rotational position of the indicating shafts in a meter head converted in accordance with this invention.

Another object of this invention is to provide a reading tool having a plurality of rotatable magnets therein, the magnets being shielded from substantial interference with each other by magnetizable metal disposed between said magnets.

Another object of this invention is to provide an apparatus wherein a first set of magnets is rotatably positioned by oppositely disposed magnets of a second set, the magnetic attraction between a magnet of the first set and an oppositely disposed magnet of a second set being relatively stronger than the magnetic attraction between said magnet of the first set and any other magnet of the first set.

Another object of this invention is to provide an apparatus wherein a first set of magnets is rotatably positioned by oppositely disposed magnets of a second set, the various magnets of the first set being shielded one from the other by magnetizable metal disposed therebetween.

Another object of this invention is to provide a meter head which can be at least partially filled with oil thereby eliminating damage due to water intrusion thereinto.

Other objects, features and advantages of this invention will be apparent to one skilled in the art upon consideration of the written specification, the appended claims and the attached drawings wherein:

Figure 1:
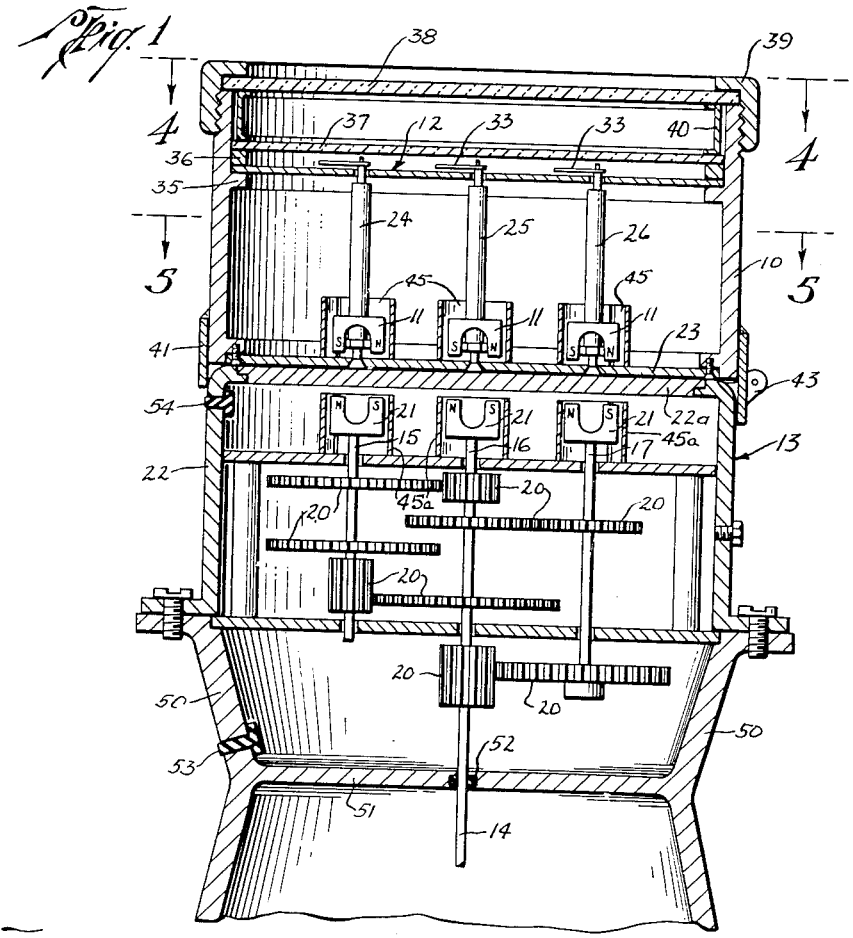
Fig. 1 is a vertical sectional view of a preferred embodiment of the apparatus of this invention including an indicating tool shown in place upon a meter head which has been converted for use with such apparatus.

Fig. 4 is a view taken on the line 4—4 of Fig. 1;

Fig. 5 is a view taken on the line 5—5 of Fig. 1;

Fig. 6 is a view similar to Fig. 5 but illustrating another arrangement of magnet shields;

Fig. 7 is a view of still another magnet shield;

Fig. 8 illustrates another embodiment of the indicating tool and shows a restraining or clamping means positioned to prevent movement of the magnets; and Fig. 9 is a view similar to Fig. 8 but shows the indicating tool in place on a meter head and the magnets released for rotation.

Referring to the drawings, the apparatus of this invention includes an indicating tool or reading tool 9 comprising a housing 10, a plurality of magnets 11 mounted on the housing for rotation therein, an indicia bearing means designated generally by the numeral 12 and permitting an observation of the relative rotational positions of the magnets.

Referring to Figs. 1, 4, and 5, there is shown a meter head 13 having a drive shaft 14 which is rotated responsive to the passage of a quantity of materials or substance, such as gas, electricity or water, through the meter, and a gear train including a plurality of indicating meter shafts 15, 16, and 17 which are driven by shaft 14 through a conventional gearing mechanism including gears 20. With this arrangement, each of shafts 15 through 17 will be turned a predetermined amount relative to the others. For example, shaft 15 may make one revolution for each ten of shaft 16, and shaft 16 one revolution for each ten of shaft 17, etc. The construction and arrangement of shaft 14, gears 20 and the indicating shafts are well known to those skilled in the art and will not be further described here for that reason. It will be understood however that, with the embodiments of the apparatus illustrated, two additional indicating shafts, other than shafts 15, 16 and 17, are employed but are not shown for reasons of simplicity. Thus the indicating shafts have the same general lateral disposition as shown in Fig. 5 for the magnet supporting shafts.

In accordance with this invention, the pointers which are conventionally mounted on the indicating shafts are removed and each replaced with a magnet 21. Magnets 21 are preferably of the U or horseshoe-shaped type with the north and south poles disposed to face and being adjacent to the face 22a of cap 22 which is bolted over the meter head. Face 22a is formed of a non-magnetic metal, such as brass, and replaces the conventional glass window in the heretofore known types of cover. In this manner, there is provided a cover or cap which is not subject to being easily broken and which can be made very strong to withstand any blows which it may encounter. Thus, the cover or cap is made of a non-magnetic material having substantial resistance to breakage, that is, a substantially greater resistance than is provided by conventional meter caps having a glass window, and preferably is made in a single piece to eliminate the necessity for sealing joints which would exist were the cap made of two or more parts.

It will be noted that magnets 21 are each mounted to have at least one of their poles laterally displaced from the rotative axis of the indicating shaft on which it is mounted. The reason for this will be explained hereinafter.

As will be seen in Fig. 1, housing or frame 10 is adapted to be placed over the top of cap 22 and to have a bottom or end portion 23, of non-magnetic metal or similar, in close proximity thereto. Magnets 11 are each disposed within housing 10 respectively opposite one of magnets 21 and are adapted to rotate about axes which are preferably substantially coaxial with the indicating shafts in the meter head. Magnets 11 are likewise mounted on shafts 24, 25, 26, 27 and 28 to have at least one of their poles laterally displaced from the shaft on which it is mounted. Also, each of magnets 11 is disposed so that its poles are in substantial alignment with the unlike poles of an opposite one of magnets 21. By this arrangement, the attraction of a pole of a magnet 21 for an unlike pole of an opposite one of magnets 11 is provided with a moment arm whereby the position of magnets 21 is determinative of the position of magnets 11.

Figure 3:
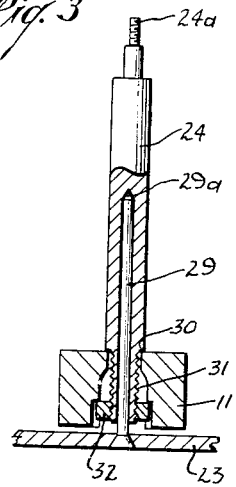
Fig. 3 is a view of a portion of the apparatus of Fig. 1 and shows particularly the construction of a magnet mounting in the indicating tool.
Figure 2:
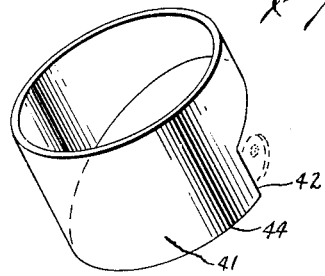
Fig. 2 is a detail of the detent and aligning device shown in section on the indicating tool of Fig. 1.

Means are provided for rotatably mounting magnets 11 in housing 10. Referring to Fig. 3 wherein there is detailed a mounting identical for all of magnets 11, shaft 24 is counterbored to receive a bearing rod 29, the latter being supported in an upright position from end portion 23. Shaft 24 rests upon the pointed end 29a of rod 29 and preferably the conical end of rod 29 has an apex angle less than that of the conical end of the counterbore in shaft 24 so that the latter actually rests on the uppermost point of rod 29. In this manner, magnets 11 are mounted for free rotation in housing 11 and are maintained relatively free from lateral movement by the sides of rod 29 bearing against the walls of the counterbore in shaft 24 whenever any such laterally moving tendency of magnets 11 is encountered.

Magnets 11 can be mounted on their shafts by providing on the latter a shoulder 30 for the magnets to bear against. The end 31 of the shafts is threaded to receive nut 32 which maintains the magnet in place. Such type of assembly is particularly adapted for mass production in establishments having limited facilities.

The other end 24a of shafts 24 through 28 has a pointer or indicator 33 attached thereto as by clamping thereon with a nut or by soldering in place. A meter dial 34 is provided for the pointers in much the same manner as a conventional dial is provided in ordinary meters. In this manner, indicia bearing means, including dial 34 and pointers 33, are associated with magnets 11 to permit an observation of their relative rotational position.

Dial 34 rests on an inturned shoulder 35 of housing 10 and has spaced thereabove, as by spacer ring 36, a glass or transparent plastic disc 37. It will be noted that disc 37 is slightly spaced from the upper ends 24a of shafts 24 through 28. Whenever any of magnets 11 happen to be positioned, as when housing 10 is placed over meter head 13, with like poles of the opposing magnets in alignment, the repelling force of the magnets tends to lift the particular magnet 11 so positioned and its attendant shaft and such lifting may cause the shaft to bind on its bearing rod or with meter dial 34 so that it cannot rotate for proper alignment. The close proximity of disc 37 to the upper ends of the shafts 24 through 28 prevents any appreciable lifting of the latter so that proper alignment of the magnets is positively achieved.

The remainder of housing 10 can comprise a glass or plastic window 38 maintained in place by a cap ring 39 screwed to housing 10. An annular spacer channel 40 can be provided between window 39 and disc 37 to maintain the latter in proper position.

It will be apparent from the above that each of magnets 11 should be approximately positioned above a respectively opposite magnet 21. To ensure this, an indexing means or a detent means is provided for securing proper rotative alignment between housing 10 and meter head 13. This can comprise a cylindrical sleeeve 41 carried by housing 10 to extend beyond the end portion 23 thereof. Sleeve 41 has a vertical shoulder 42 adapted to abut against an ear 43 on cap 22 when proper alignment is secured. It will be noted that the lower periphery 44 of sleeve 41 is a smooth curve from one end of shoulder 42 around the sleeve to the other end of shoulder 42. With this construction, housing 10 can merely be placed atop the meter head and turned. When it has been turned sufficiently, shoulder 42 will abut ear 43 and the proper rotative alignment will have been attained.

It will be apparent from the foregoing that, since magnets 11 are freely rotatable, the accuracy with which magnets 11 reflect the position of magnets 21 will be dependent upon the magnitude of magnetic attraction of one of magnets 11 for an adjacent one of magnets 11. Thus, when magnets 11 are relatively closely spaced together, as they ordinarily must be to function with most meters, adjacent ones of magnets 11 could exert at times a torque on each other. This torque would have to be overcome by the magnetic attraction of one of magnets 21 in order to properly align magnets 11. As a result, magnets 11 would assume a position of balance between these two opposing forces and such position would not be a true reflection of the magnets 21 position.

To minimize the magnetic attraction among magnets 11, they, as well as magnets 21, can be spaced apart sufficiently far that the torque applied to any one of magnets 11 by any or all of the other magnets 11 is small enough that a meter reading of the desired degree of accuracy is obtained. Such spacing will be dependent upon the individual strength of magnets 11 and, to some extent, upon their shape.

Commercial meter heads in present day use will not ordinarily permit the wide spacing apart of the magnets as above set forth due to the compactness and small diameter of such heads. In such cases, the magnetic turning influence of one magnet 11 upon another magnet 11 can be overcome to permit readings of the desired degree of accuracy by providing magnets 21 to be of stronger magnetic attraction for the opposite ones of magnets 11 than is the magnetic attraction among magnets 11. Thus, magnets 21 can be larger than magnets 11 so that the magnetic attraction between opposite ones of magnets 11 and 21 is sufficiently larger than the misaligning magnetic attraction among magnets 11 that magnets 11 are aligned to the desired extent with magnets 21.

However, it is preferred to provide means for substantially eliminating the magnetic attraction among magnets 11. Such means can comprise a shield comprising a mass of magnetizable metal disposed between adjacent ones of magnets 11 and extending sufficiently far to either side of a plane through the rotative axes of such adjacent magnets that the magnetic attraction is substantially eliminated. In one form, such shield can be an annular sheet 45 of magnetizable metal having a gap 46. One of the annular sheets is disposed around at least all but one of magnets 11. In another form, such shield can be an annular sleeve 47 as shown in Fig. 7. Sleeve shields 47 are disposed around magnets 11 in the same manner as shields 45. In still a third form, the shields can be strips of metal 48, as in Fig. 6, each disposed between adjacent magnets 11.

With such shields, it has been found that the magnetic attraction among closely spaced magnets 11 is eliminated to the extent that rotation of one of the magnets 11 does not exert any observable torque on another magnet 11. In the absence of such shields and with magnets 11 similarly spaced, each of magnets 11 will quickly be turned by the other magnets 11 until aligned with unlike poles adjacent each other.

As another feature of this invention, means are provided whereby meter head 13 can be at least partially filled with oil. In conventional water meters, meter head 13 is packed from the remainder of the meter and is provided with a drain hole to ensure that any water therein will be drained away. In accordance with this invention, means are provided to extend across cap 22 to seal the same and means are also provided for introducing oil into the meter head. The sealing means can comprise wall 50 of the meter and a transverse wall 51 dividing the meter head from the remainder of the meter body. A packing 52 can be provided between drive shaft 14 and wall 51. Extending through the wall 50 and cap 22 are rubber grommets 53 and 54. In introducing oil into the meter, a hollow needle connected to a source of oil under pressure can be inserted through grommet 53 and a second hollow needle inserted through grommet 54 to permit escape of air from the meter head. After the desired amount of oil has been added to the meter head, the needles can be withdrawn and grommets 53 and 54 will seal themselves shut to completely enclose the meter head. Then, even if packing 52 leaks, as often happens, the oil in the meter head will float upon any water that may enter and prevent the latter from contacting gears 20. When the meter head is completely filled with oil, no water can enter the head. This arrangement obviates the necessity of making gears 20 and the indicating shafts of corrosion resistant metal as is now common practice and these parts can be made of suitable cheaper metals.

In some instances, it is desirable to place the indicating tool of this invention on a meter head to orient the magnets 11 and then remove the tool before taking the reading. To permit this, means can be provided for restraining the movement of the magnets 11 when the tool is not in position on the meter head. When the tool is in such a position, the restraining means are released to permit the magnets 11 to be oriented by magnets 21. Referring to Figs. 8 and 9, such means can be provided by removing spacer ring 36 and spacer channel 40 from the tool shown in Fig. 1 whereby disc 37 is free to bear against the upper ends 24a of shafts 24 through 28. Means such as springs 55 are provided to urge disc 37 against the upper ends 24a with sufficient force that the friction between the disc and the shafts prevents the latter from turning. Means are also provided to release the contact between disc 37 and shafts 24 through 28 comprising rods 56 carried by the housing 10 and extending slightly from the end portion 23 thereof so that when the indicating tool is placed over the meter head, the rods will be moved to raise disc 37 from contact with ends 24a as shown in Fig. 9. Then upon removal of the tool from the meter head, springs 55 urge both disc 37 and rods 56 to the Fig. 8 position.

If desired, shields 45a can be disposed between adjacent ones of magnets 21. Such shields comprise a mass of magnetizable metal extending between adjacent ones of magnets 21 and can have the form of shields 45, 47 or 48 and can be situated in a similar manner to that described above with respect to magnets 11. The shielding of magnets 21 serves to limit the attractive force of any one of these magnets to the magnet 11 opposite thereto. In this manner, the attraction of a magnet 21 is substantially confined to orienting an opposite one of magnets 11 so that unwanted interference with any other magnet is substantially reduced.

Although the operation of the apparatus of this invention is believed apparent from the foregoing, a brief summary will be given to insure an adequate disclosure.

With the reading tool and meter head constructed as shown in Fig. 1, a meter reading can be taken by merely placing the tool on top of the head and turning it until shoulder 42 abuts ear 43. Then, by observing the positions of pointers 33, the meter reading can be taken in the same manner as with conventional meters. Should it be desired to orient magnets 11 and then to read the tool after it has been removed from the meter head, the apparatus of Figs. 8 and 9 is employed. The tool of these latter figures is placed over the meter head in the same manner as above described with respect to Fig. 1. In so doing, disc 37 is moved to permit magnets 11 to freely rotate and upon lifting the tool from the meter head, springs 55 press disc 37 against the ends of shafts 24 to 28 thereby maintaining the pointers 33 in the same position as they were oriented by the magnets 21 in the meter head.

It will be understood that certain features and subcombinations are of utility and may be employed without reference to other features and subcombinations.

This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. As a subcombination, a meter head comprising a cap having an endwise face of non-magnetic material, said endwise face having an outermost external surface exposed to temporarily seat a portable reading tool thereon and being of sufficient strength and thickness to resist without breakage blows to which a meter head is commonly subjected, a plurality of substantially parallel indicating shafts mounted for rotation within said cap, means connecting said indicating shafts for rotating each of them a predetermined amount relative to the others, a plurality of drive magnets each of which are mounted on one of said indicating shafts for rotation therewith, said drive magnets being situated sufficiently close to said face to exert a magnetic force thereacross and each having at least one of its poles laterally disposed of the rotative axis of the shaft on which it is mounted for rotation thereabout, and a detent part fixedly carried by said cap and having an abutment face disposed laterally of the rotative axes of at least some of said shafts and in a predetermined fixed position with respect to the rotative axes of all of said shafts whereby a portable reading tool having a plurality of rotatable driven magnets therein can be placed on said endwise face and then turned until a predetermined part on the tool engages said abutment face at which position the rotational axes of the driven magnets will be coaxially aligned with the rotational axes of said drive magnets.

2. As a subcombination, an indicating tool for reading meters which comprises a housing having an end removably positionable on a meter head, driven means including a plurality of magnets laterally spaced apart across said end, means carried by said housing supporting said driven means for rotation therein, indicia bearing means associated with said magnets to permit an observation of their relative rotational position and means for releasably restraining the movement of said driven means and magnets including a part mounted in the housing for movement into and out of frictional engagement with all of said driven means, means urging said part into such frictional engagement to hold the driven means against rotation, and a pin carried by the housing in engagement with said part and movable in one direction with respect to the housing to move said part out of said frictional engagement, said pin having a portion extending beyond said face when said part is in said frictional engagement whereby the housing can be placed with said end in abutment with a meter head to thereby move said pin which in turn moves said part out of said frictional engagement to free the driven means and upon lifting the housing from such meter head, the urging means moves said part into said frictional engagement to prevent rotation of said driven means.

3. In a metering apparatus including a meter having a body, the combination which comprises a meter head adapted to be permanently mounted on said body and including a plurality of shafts arranged to represent a metered value by their relative rotational positions, first magnets each connected to one of said shafts to be rotated thereby, a cap carried by the meter body and having an endwise face of non-magnetic material extending over said first magnets to enclose the same within the meter head, said endwise face being of sufficient strength and thickness to resist without breakage blows to which a meter head is commonly subjected; a portable indicating tool constructed for use in successively reading a plurality of meters each of which is equipped with one of such meter heads, including a housing separate from the meter head and having a portion shaped for placement in temporary abutment with said cap but readily removable from said cap, a plurality of second magnets mounted in and carried by said housing for rotation independently of each other and about parallel rotational axes laterally spaced apart from each other distances such that with said housing occupying a predetermined rotative position on said cap, the rotational axis of each of said second magnets is coaxially aligned with the rotational axis of one of said first magnets, indicia means associated with said second magnets to permit an observation of their relative rotational position and first and second aligning parts respectively carried by said housing and said cap and being in positions thereon such that when said housing is in said predetermined rotative position on the cap, said aligning parts are in alignment with each other; said housing, second magnets, indicia means, and first aligning part being arranged as a unitary structure separate from said cap so that such structure can be carried between and successively employed with a plurality of said meter heads.

4. In a metering apparatus including a meter having a body, the combination which comprises a meter head adapted to be permanently mounted on said body and including a plurality of shafts arranged to represent a metered value by their relative rotational positions, first magnets each connected to one of said shafts to be rotated thereby, a cap carried by the meter body and having an endwise face of non-magnetic metal extending over said first magnets to enclose the same within the meter head, said endwise face being of sufficient strength and thickness to resist without breakage blows to which a meter head is commonly subjected; a portable indicating tool constructed for use in successively reading a plurality of meters each of which is equipped with one of such meter heads, including a housing separate from the meter head and having a portion shaped for placement in temporary abutment with said cap but readily removable from said cap, a plurality of second magnets mounted in and carried by said housing for rotation independently of each other and about parallel rotational axes laterally spaced apart from each other distances such that with said housing occupying a predetermined rotative position on said cap, the rotational axis of each of said second magnets is coaxially aligned with the rotational axis of one of said first magnets, indicia means associated with said second magnets to permit an observation of their relative rotational position; and first and second detent parts respectively carried by said housing and said cap and having abutment surfaces respectively extending substantially radially of the housing and cap, said abutment surfaces being disposed so that upon placing the housing on said cap and then turning the housing to said predetermined position, the abutment surfaces are brought into opposing mutual engagement to prevent further turning of the housing; said housing, second magnets, indicia means, and first detent part being arranged as a unitary structure separate from said cap so that such structure can be carried between and successively employed with a plurality of said meter heads.

5. The apparatus of claim 4 wherein said first magnets are substantially stronger in magnetic attraction than said second magnets whereby the magnetic attraction of one of said second magnets for another second magnet is substantially overcome by the greater attraction of a first magnet for a second magnet opposite therefrom.

6. The apparatus of claim 4 wherein said second magnets are shielded one from the other by a shield comprising a mass of magnetizable metal disposed between adjacent ones of said second magnets.

7. As a subcombination, a portable reading tool for reading successive meters which comprises: a housing shaped for placement in temporary abutment with a meter head, said housing including a supporting part connected thereto for movement therewith; a plurality of driven magnets mounted on said supporting part for independent rotation about substantially parallel axes; indicia bearing means associated with said driven magnets to permit an observation of their relative rotational positions; and a detent part carried by said housing with the detent part being disposed laterally of the rotative axes of at least some of said driven magnets and in a predetermined fixed position with respect to the rotative axes of all of said driven magnets; said housing, supporting part, driven magnets, indicia bearing means, and detent part being arranged as a unitary structure separate from a meter head upon which such structure is to be placed in abutment so that the structure can be placed on such meter head and then turned until said detent part engages a cooperating part on such meter head whereupon the rotative axes of said driven magnets will be coaxially aligned with the rotative axes of drive magnets disposed in such meter head to permit an accurate reading to be taken whereupon the structure can be lifted from such meter head and carried to another similar meter head to take a reading thereon.

8. The subcombination of claim 7 in combination with shields of magnetizable metal disposed between adjacent ones of said driven magnets.

References Cited in the file of this patent

UNITED STATES PATENTS

| | | |
|---|---|---|
| 280,322 | Nash | June 26, 1883 |
| 2,514,323 | Ford | July 4, 1950 |
| 2,620,412 | Ford | Dec. 2, 1952 |

FOREIGN PATENTS

| | | |
|---|---|---|
| 624,654 | Germany | Jan. 25, 1936 |